Sept. 3, 1940.   O. RISZDORFER   2,213,942
LIGHT MEASURING APPARATUS FOR PHOTOGRAPHIC CAMERAS
Filed April 5, 1938
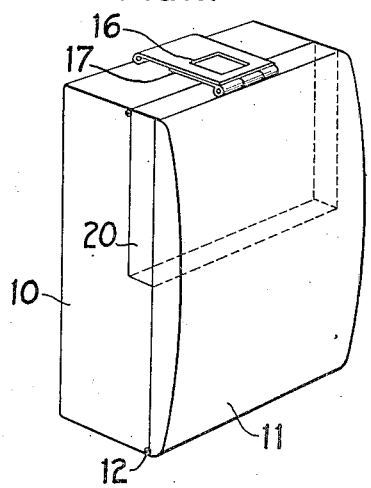
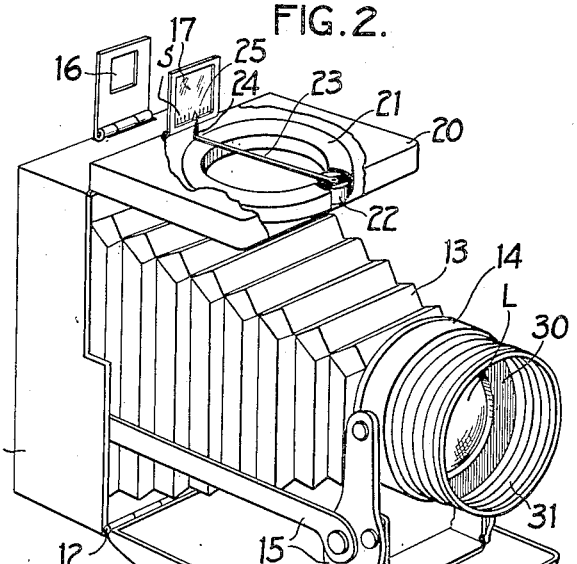
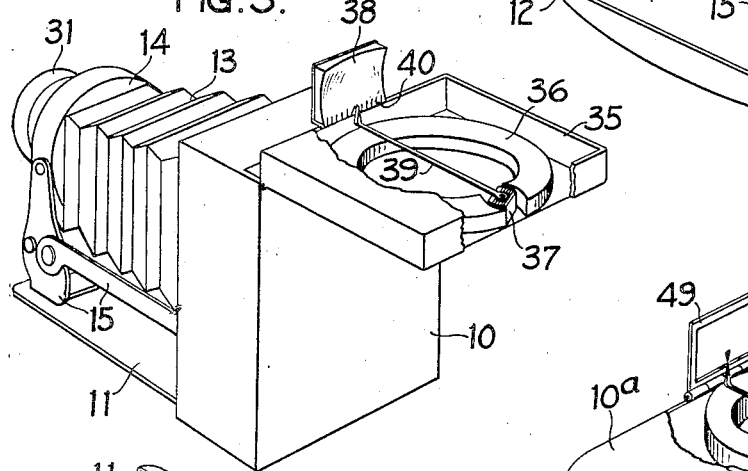
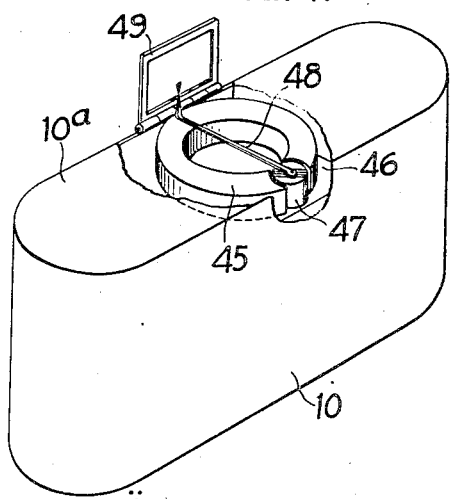
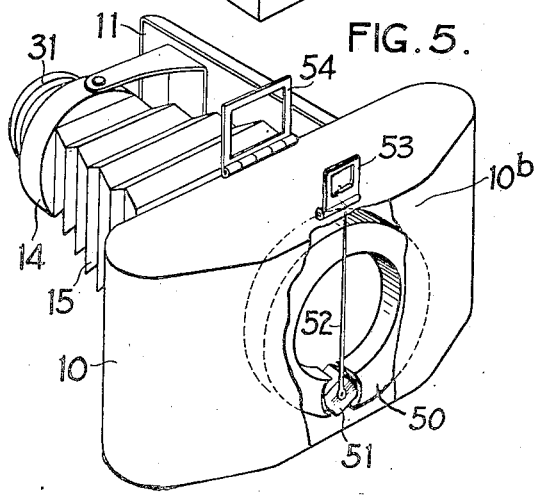
ÖDÖN RISZDORFER
INVENTOR
ATTORNEYS Patented Sept. 3, 1940

2,213,942

UNITED STATES PATENT OFFICE 2,213,942

LIGHT MEASURING APPARATUS FOR PHOTOGRAPHIC CAMERAS

Odon Riszdorfer, Budapest, Hungary

Application April 5, 1938, Serial No. 200,112
In Hungary March 16, 1934

5 Claims. (Cl. 88—23)

This invention relates to photographic cameras and more particularly to cameras provided with a built-in exposure meter for determining the exposure setting.

This application is a continuation in part of my copending application Serial Number 11,367 filed March 15, 1935.

The present invention has for its principal object the provision of a camera in which a light-measuring device is incorporated in a manner that will render such a device highly efficient and accurate without adding greatly to the external dimensions of the camera. Another object is the provision of means whereby the indicator actuated by the light measuring device is visible to the operator within the field of the view finder. Other objects and advantages will appear in the specification, and may be understood by reference to the accompanying drawing, in which all the views are in perspective, and in which Fig. 1 illustrates, from the front, a camera with a built-in light measuring device, the bed of the camera being closed;

Fig. 2 is a similar view of the camera shown in Fig. 1, the bed being opened and the lens in operative position;

Fig. 3 illustrates, viewed from the back, a camera having a part of the light measuring device hinged to the camera body;

Fig. 4 shows an element of the light measuring device sunk into the top of a camera; and Fig. 5 shows a similar part enclosed within the back of a camera.

Referring first to Figs. 1 and 2, the camera shown is of the type using plates or pack film, and comprising a body 10, a bed 11 hinged to the body at 12, and the usual bellows 13, lens L and shutter unit 14, with bed braces and front-erecting linkage 15. A view finder having a rear peepsight 16 and a front lens element 17 is arranged to fold down or to be opened for use, as shown in Figs. 1 and 2 respectively.

Hinged to the front upper edge of the camera body 10, and arranged to lie close thereto or to be erected to a position parallel to the bed 11, is a box-like frame 20 in which is fixed a magnet 21. Within the gap of the magnet is an armature coil 22. An indicator or pointer 23 is attached to the pivot of the armature coil and has an upturned end 24 that projects into the field of the front element 17 of the view finder when the latter is erected. In the drawing this front element is shown hinged to one edge of the magnet frame 20. A suitably calibrated scale S or a single index mark 25 may be on or incorporated with the lens element 17, whereby the indication given by the pointer 23 may be interpreted into usable terms, and may be viewed through the view finder. The magnet 21, coil 22, indicator 23, and scale S, together constitute an electric measuring instrument.

To actuate the pointer 23, a light-sensitive cell 30, preferably of the photo-voltaic type, is arranged in ring form to surround the lens L. A suitable circuit, not shown, conducts the micro-current set up in the cell 30 when the latter is exposed to the light through the armature coil 22. The latter is thus energized to move pointer 23 to give a visual indication of the illumination cast upon the cell 30.

As shown in Fig. 2 the cell 30 surrounds the objective lens L in an annular form. In order to prevent the photo cell 30 being influenced by light arriving from a lateral direction, a screen or hood 31 may be provided around the cell 30 as shown. This screen 31 is preferably made of some resilient material as, for example, rubber or some textile fabric supported by springs, so as to be capable of being compressed in a well known manner. The purpose of the hood 31 is to restrict the cone of light falling on the cell 30 to substantially the same angle as that accepted by the lens L for forming the picture image, thereby resulting in a more accurate indication of the required exposure than would otherwise be obtained. By making the hood 31 collapsible, it does not increase the size of the camera when in folded condition.

In Fig. 3 is shown a modification of the structure above described, the box-frame 35 containing the magnet 36 and the coil 37 in this case being hinged to the upper rear edge of the body 10 in such a manner that there will be no interference with the insertion and removal of plates or film packs. The rear element of the view finder (not shown) may be mounted on the rear edge of the frame 35, while the front element or negative lens 38 may be hinged on the top of the body 10, so that the upturned end of the indicating pointer 39 may be observed in its relation to the scale 40.

Fig. 4 illustrates one arrangement of the light measuring device applied to a roll-film type of camera. The magnet ring 45 in this structure is located within a recess 46 in the top wall 10ᵃ of the camera, and may be suitably enclosed for protection. The armature coil 47 carries a pointer 48, similar to that in the structures previously described, this pointer also being visible in the view finder 49.

Fig. 5 illustrates another modification, wherein the magnet 50 and armature coil 51 are disposed within the back 10b of the camera, the back being extended or slightly bulged outwardly to accommodate these elements behind the focal plane or film path. The pointer 52 in this arrangement projects into the opening of the rear view finder frame 53. The front element 54 of the finder may be hinged as in the other illustrations.

It is to be understood that in all of the modified forms shown, the photo-voltaic cell 30 is arranged to encircle the lens mount as in Fig. 2, and also that a hood 31 surrounds the cell to exclude unwanted light which would give an incorrect indication of the illumination of the subject.

Other modifications, embodying combinations of an annular cell and an indicating means may be applied to various types of cameras. The forms shown herewith, however, will serve to illustrate the invention as defined in the following claims.

I claim:

1. The combination, with a camera having a lens and a view finder, of a light-sensitive cell surrounding the lens, an electric indicating instrument foldably hinged to the camera body and having a calibrated element, a pointer adapted to move in accordance with energy generated in said cell, said calibrated element being visible in the view finder.

2. The combination with a camera having a lens, a view finder and a bed member, of a light-sensitive cell surrounding the lens, an electric measuring instrument mounted in a frame hinged to the camera body and foldable between the camera body and the bed member, said instrument having an indicator and a scale simultaneously visible in the view finder when the hinged frame is elevated.

3. The combination with a camera having a lens, of a light-sensitive cell surrounding said lens, a frame hinged to the camera and carrying an electric-measuring instrument, the latter having an indicator movable by energy generated in said cell, a scale associated with the indicator and a view finder having one element mounted on the camera body and another element mounted on the hinged frame, said indicator and said scale being visible in the view finder when the frame is elevated.

4. In a camera of the folding type, a camera body having an opening in one side, a lens and bellows collapsible into the body through the opening, a plate member carrying an indicating instrument and hingedly attached to said body along one edge of the opening, and a cover plate hingedly attached to said body along another edge of the opening, said plate member being adapted to close a portion of said opening and said cover plate being adapted to close the remaining portion of said opening and to cover said plate member when in folded position.

5. In a camera of the folding type provided with a photometer including an electric indicating instrument, the combination with a body of substantially rectangular shape having an opening in one side, of a bed hingedly attached to said body along an edge of said opening adapted to close said opening, camera parts mounted on the camera and foldable into the opening, a substantially flat container for said instrument hingedly attached to said body along another edge of said opening adapted to swing to a position between the camera parts and the bed when the camera is folded.

ODON RISZDORFER.